Oct. 27, 1959     C. VAN DER LELY ET AL     2,909,888
RAKING WHEELS WITH TINES
Filed Oct. 2, 1958     2 Sheets-Sheet 1
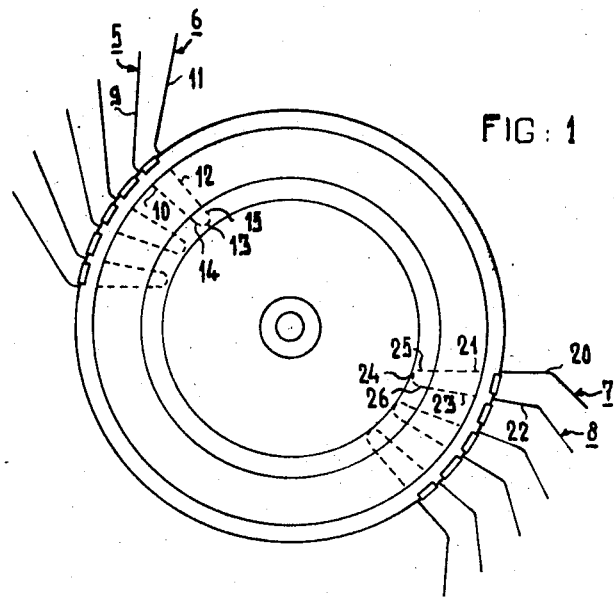
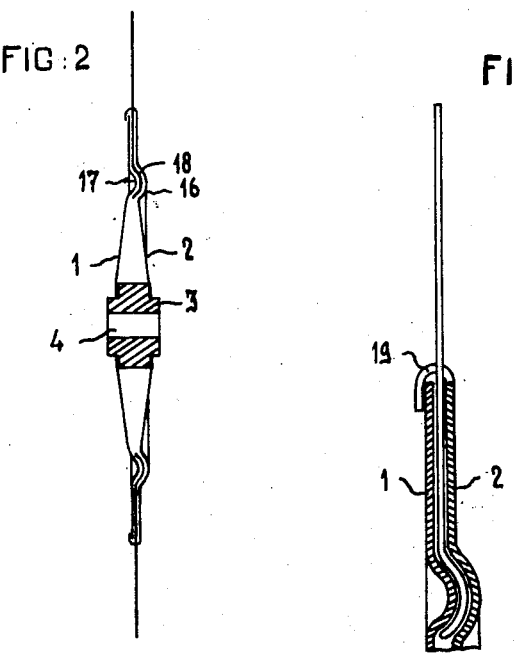
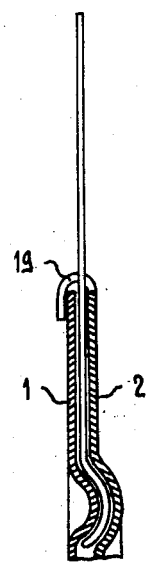
INVENTORS
Cornelis van der Lely
and Ary van der Lely
BY Oct. 27, 1959     C. VAN DER LELY ET AL     2,909,888
RAKING WHEELS WITH TINES
Filed Oct. 2, 1958     2 Sheets-Sheet 2
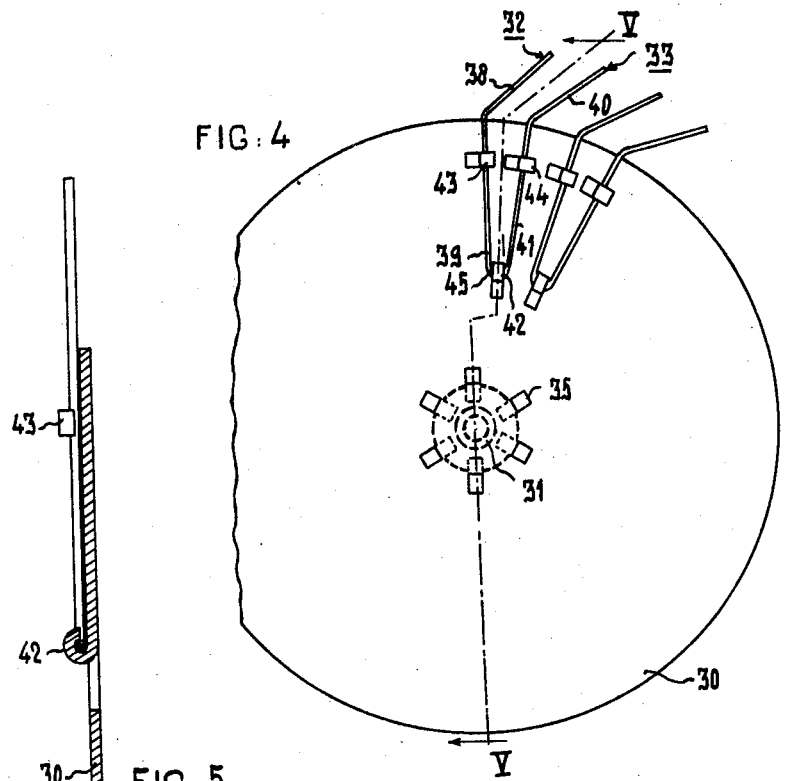
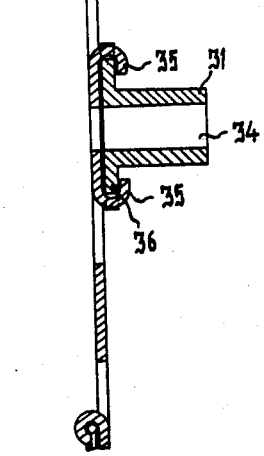
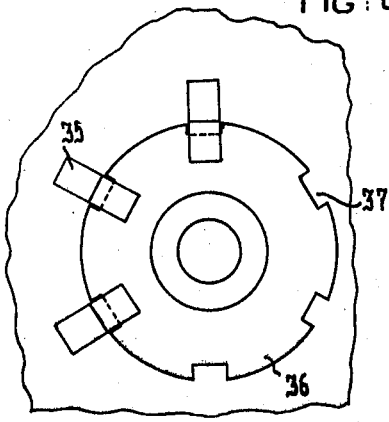
INVENTORS

United States Patent Office 2,909,888
Patented Oct. 27, 1959

2,909,888

RAKING WHEELS WITH TINES

Cornelis van der Lely and Ary van der Lely, Maasland, Netherlands, assignors to C. van der Lely N.V., Maasland, Netherlands, a Dutch limited company Application October 2, 1958, Serial No. 764,821

Claims priority, application Netherlands October 22, 1957

14 Claims. (Cl. 56—377)

This invention relates to raking or like wheels of the kind comprising a wheel body carrying tine-like fingers extending peripherally therefrom and capable of engaging and displacing material lying on, for example, the ground when the wheel is rotated and is caused to travel over the ground. Wheels of the kind just set forth are generally known and are commonly used in agriculture for working crops lying on the ground. The construction of these wheels is such that, in their manufacture, various parts have to be assembled manually, which is time-consuming and costly. The invention has for its object to provide a wheel of the kind set forth, which can be manufactured substantially completely with the aid of machinery, so that the production time is low and also the cost.

In accordance with the invention there is provided a wheel of the kind set forth, wherein the wheel body is substantially plate-shaped part and is locally deformed to provide anchorages for the fingers.

An advantageous embodiment of the invention is obtained by locating a portion of each finger between two plate-shaped parts, which parts are connected together by local deformation of at least one of them. Preferably, one of the plate-shaped parts has a tab, which is bent around the other plate-shaped part.

A useful construction of the wheel according to the invention is obtained by anchoring the fingers in such manner that portions thereof lying within the periphery of the wheel body are left free for torsional deflection. The portions of the fingers then extending outside the periphery of the wheel body can be arranged for deflection out of the wheel plane against torsional opposition of the portions within the periphery of the wheel body. Such deflections may be large even though the extent of the portions of the fingers beyond the periphery of the wheel body is but small. Such an arrangement is advantageous where for example the wheel is employed as a rake wheel.

The construction of a wheel according to the invention is simplified if two of the fingers are joined to each other, a deformation then embracing the junction between the two fingers.

For a better understanding of the invention, reference will now be made by way of example to the accompanying drawings in which:

Figure 1 is a front elevation of a first embodiment of a wheel, two different kinds of fingers being shown, Figure 2 is an elevational side view of the wheel shown in Figure 1 with parts broken away and shown in section, Figure 3 is an enlargement of part of the section shown in Figure 2, Figure 4 is a front elevation of a second embodiment of a wheel, Figure 5 is an enlarged partial section taken along the line V—V in Figure 4, and Figure 6 is a view on an enlarged scale of a detail of the wheel shown in Figure 4.

Referring first to Figures 1, 2 and 3, the wheel there shown comprises two annular plate-shaped parts 1 and 2 mounted on a hub 3 having a hole 4 for reception of a shaft upon which the wheel can turn. Fingers are located between the plates 1 and 2, and in Figure 1 two different kinds of fingers are shown. The fingers are anchored to the wheel body formed by the plates 1 and 2 and hub 3, by locally deforming at least one of the plates 1 and 2. In the upper left-hand part of Figure 1 fingers 5 and 6 are shown, whilst at the opposite side fingers 7 and 8 are shown. The fingers 5 and 6 respectively include portions 9 and 10 and portions 11 and 12. The portions 10 and 12 are located between the plates 1 and 2, whilst the portions 9 and 11 are located beyond the periphery of the wheel body. Portions 9 and 11 are inclined to the portions 10 and 12, the portions 9 and 11 being bent in the plane of the wheel at locations just beyond the periphery of the wheel body. The fingers 5 and 6 are integral, being joined by a bent portion 13.

The fingers 5 and 6 are anchored relative to the plates 1 and 2 by forming complemental circularly extending bulges 16 and 17 in the plates. The bent portion 13 is held between the complemental deformations as also are the ends 14 and 15 of the portions 10 and 12. The parts of the fingers 5 and 6 trapped between the complemental deformations or struck out tabs are bent as indicated at 18 in Figure 2 so as to extend out of the wheel plane. As appears from Figure 1, further fingers like the fingers 5 and 6 are arranged around the periphery of the wheel body, portions of such fingers extending within the periphery of the wheel body being anchored by the complemental deformations in the plates 1 and 2, which deformations extend over 360° about the axis of the wheel.

The plates 1 and 2 are connected together at the periphery of the wheel body by tabs 19 which are formed on the plate 1 and which are deformed by bending over the plate 2. The tabs 19 lie between the fingers 5 and 6 and hence limit displacement of these fingers in the wheel plane. By mounting the fingers 5 and 6 in the described manner, the portions 9 and 11 thereof extending beyond the periphery of the wheel body are free for deflection in a direction perpendicular to the wheel plane, such deflection being resisted elastically by torsional stressing of the portions 10 and 12.

The fingers 7 and 8 shown in Figure 1 are similar to the fingers 5 and 6 and likewise have portions 20 and 22 extending beyond the periphery of the wheel body and portions 21 and 23 extending within such periphery. The portions 20 and 22 are however bent in the plane of the wheel at locations more remote from the periphery thereof. The portions 21 and 23 are connected by a bent portion 24, the latter together with the ends 25 and 26 of the portions 21 and 23 being anchored in the complemental deformations 16 and 17 of the plates composing the wheel body. Just as in the case of the fingers 5 and 6, the fingers 7 and 8 may be deflected against torsional resistance offered by the straight portions of the fingers anchored at one end in the wheel body.

With the two constructions so far described, the wheel can be manufactured almost completely with the aid of machinery. The fingers may be mounted in the wheel body by placing them between the plates 1 and 2 and thereafter in one operation, pressing out the complemental deformations 16 and 17 and correspondingly producing the bends 18 in the portions of the fingers extending into the wheel body. The plates 1 and 2 may be fixed on the hub 3 by, for example, spot-welding, the plates 1 and 2 being interconnected by means of the tabs 19. Alternatively the plate 1 and 2 may be interconnected by spot-welding at various locations. Although in the described embodiments the fingers are formed in integral pairs, it will be appreciated that they could be separate from one another. In this case to anchor each separate finger it must have a portion, such as 10 or 12, formed with a bend for engagement with a deformation in the plates 1 and 2. As a further alternative, the portion of a finger which is nearest the hub of the wheel may be welded to the plates 1 and 2. In this case the plates 1 and 2 will be already mechanically connected but they may be additionally stuck to each other with the aid for example of synthetic resin adhesive. It will be noted that no separate parts such as bolts and nuts are employed to secure the plates 1 and 2 together, and this leads to low manufacturing costs.

Referring now to Figures 4, 5 and 6, there is shown a wheel body formed from a plate-shaped part 30 having a hub 31 secured thereto and carrying peripheral fingers 32 and 33. As seen best in Figure 5, the hub 31, which has a hole 34 for mounting on a shaft, is mounted on the plate 30 with the aid of tabs 35 punched up from the material composing the plate 30, the tabs 35 being bent over a flange 36 forming part of the hub. These are six tabs 35 and flange 36 has six correspondingly spaced slots 37 (see Fig. 6). The tabs 35 fit into the slots 37 and prevent relative angular movement between the hub 31 and the plate 30.

The fingers 32 and 33, like the previously described fingers have portions 38 and 40 extending beyond the periphery of the wheel body and portions 39 and 41 extending within such periphery. Portions 38 and 40 are bent in the wheel plane so as to be inclined to their respective portions 39 and 41. The fingers 32 and 33 are anchored to the plate 30 by tabs 42, 43 and 44 punched up from the plate 30, the tabs 43 and 44 being bent around the portions 39 and 41, whilst the tab 42 is bent around a bent portion 45 which interconnects the portions 39 and 41. This construction of wheel is also suitable for manufacture almost completely with the aid of machinery.

The term "deformed portions" or similar language in the specification and claims as it relates to both forms of the invention includes parts 16, 17 and 19 of Figures 1–3 and the bent tabs 42, 43 and 44 as shown in Figures 4–6. The term "plate means" in the claims includes the spaced substantially cylindrical plates of Figures 1–3, or the single plate of Figures 4–6.

It will be understood that the various embodiments of the wheel of the invention described above, may be provided with various kinds of fingers in accordance with the intended use of the wheel. If the wheels are to be used for harvesting crops lying on the ground, it will be advantageous, for example, in harvesting hay, grass or dried clover, to provide very flexible fingers. However, if the wheel is to be used for weeding, it may well be advantageous to employ less flexible fingers so that the weeds can be readily drawn thereby out of the ground. If the wheel is to be employed for sweeping up rubbish lying on the ground, it will be desirable to have very flexible fingers, and it may also be useful to have several fingers arranged across the width of the edge of the wheel body. This may be achieved in the case of the wheel shown in Figures 4 to 6 by anchoring fingers on both sides of the plate 30. The wheels of the invention are also particularly suitable for employment in lawn rakes and similar small implements.

What we claim is:

1. A rake wheel or the like of the kind comprising a wheel body carrying tine-like fingers extending peripherally therefrom and capable of engaging and displacing material lying on, for example, the ground when the wheel is rotated and is caused to travel over the ground, said wheel body comprising plate means provided with radially spaced deformed portions in engagement with each finger at substantially radially spaced points on the plate means, said plate means having means for supporting an axle.

2. A rake wheel as defined in claim 1 wherein said plate means comprises a pair of spaced substantially circular plates and wherein a portion of each finger is located between the said deformed portions of the cylindrical plates.

3. A rake wheel as defined in claim 2 wherein certain of said deformed portions comprise tabs on one of said plates, said tabs being in engagement with the other plate.

4. The rake wheel of claim 3 wherein said tabs are located on the periphery of one of said plates, said tabs extending around and in engagement with the periphery of the other plate.

5. A rake wheel as defined in claim 2 wherein said finger portion is of U-shape.

6. The rake wheel of claim 2 wherein said U-shaped portion extends out of the plane of the rake wheel.

7. A wheel as defined in claim 1 wherein one of said radially deformed portions forms a circle about said axle supporting means.

8. A rake wheel as defined in claim 2 wherein the deformed portion of one plate extends within the deformed portion of the other plate, the said deformed portions being arranged in concentric relation about the said means for supporting an axle.

9. A rake wheel as defined in claim 2 wherein one of said deformed portions comprises bulged out portions on each plate, said bulged out portions providing anchorages for said fingers, said bulged out portions forming circular aligned channels.

10. A rake wheel as defined in claim 1, said radially spaced deformed portions comprising struck out tabs in engagement with said fingers.

11. A rake wheel as defined in claim 1 wherein each finger is provided with a portion between the said radially deformed portions of the plate means whereby to permit said finger to deflect torsionally about its axis.

12. A rake wheel as defined in claim 1 wherein a pair of fingers are joined to each other by means of a U-shaped portion, said U-shaped portion being engaged by one of said deformed portions of said plate means.

13. A rake wheel as defined in claim 1 wherein said means for supporting said axle comprises a hub, said plate means having additional deformations connecting said plate means to said hub.

14. A rake wheel as claimed in claim 1 wherein said plate means comprises a pair of circular disks, each disk having a periphery, the deformed portions of one of said disks being bent to engage the periphery of the other disk, and other deformed portions of both disks being bent to form circular deformations whereby to anchor the ends of said fingers.

References Cited in the file of this patent
UNITED STATES PATENTS
2,670,588    Plant _____ Mar. 2, 1954